Figure 1:
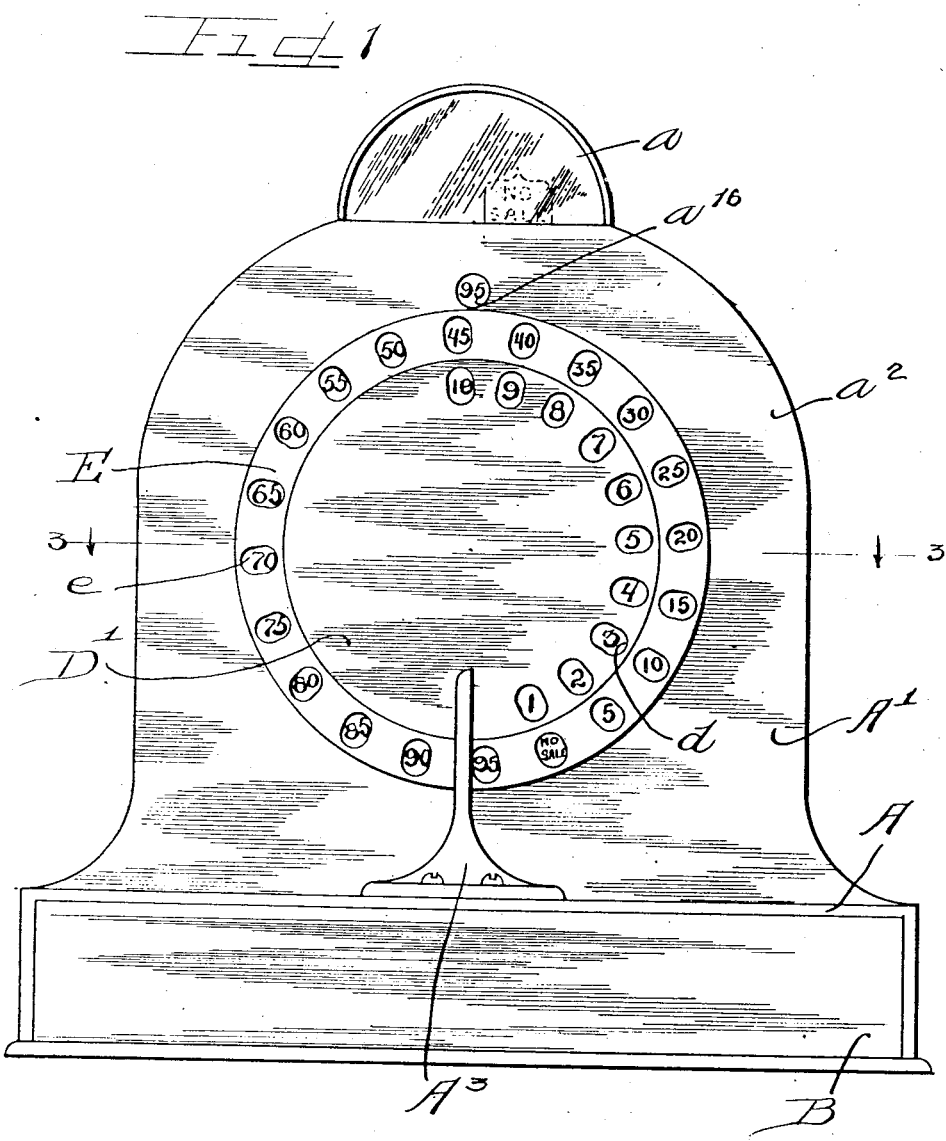

C. SULFER.
CASH REGISTER.
APPLICATION FILED MAR. 20, 1909.

1,095,151. Patented Apr. 28, 1914.
9 SHEETS—SHEET 1.

Witnesses
J. W. Angell

Inventor
Charles Sulfer.
By Charles W. Tiers
Atty

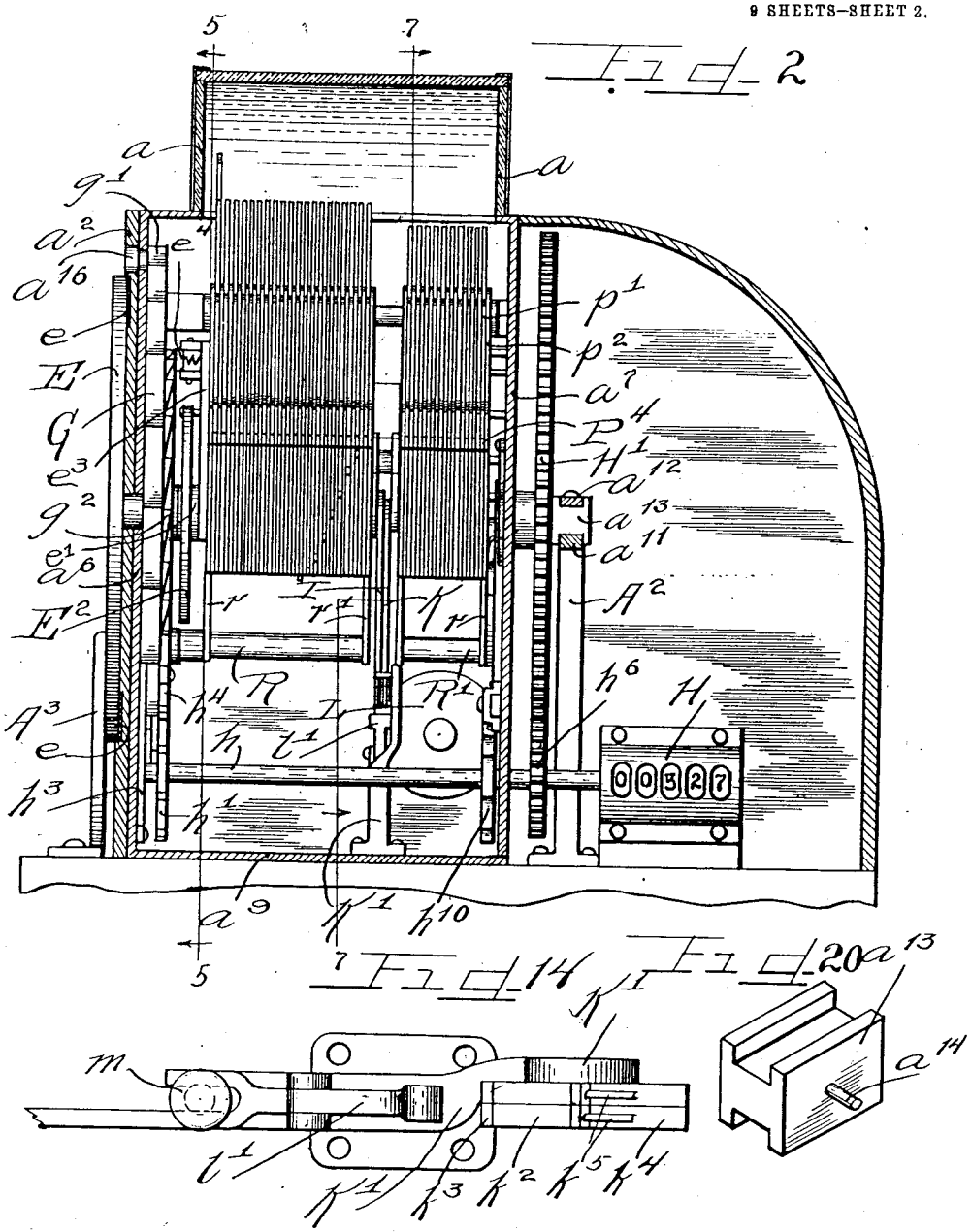

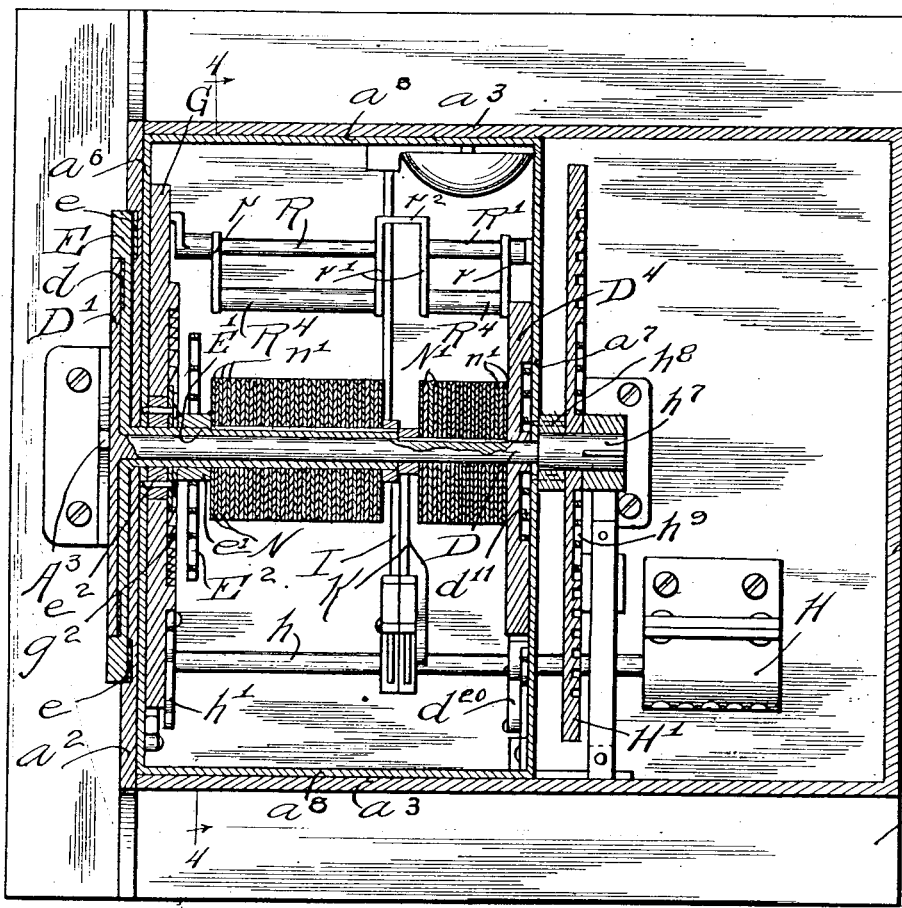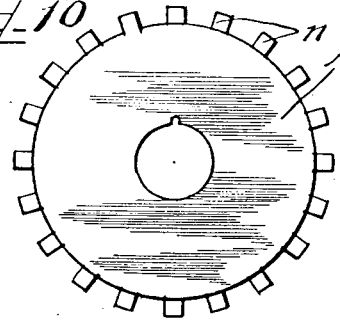

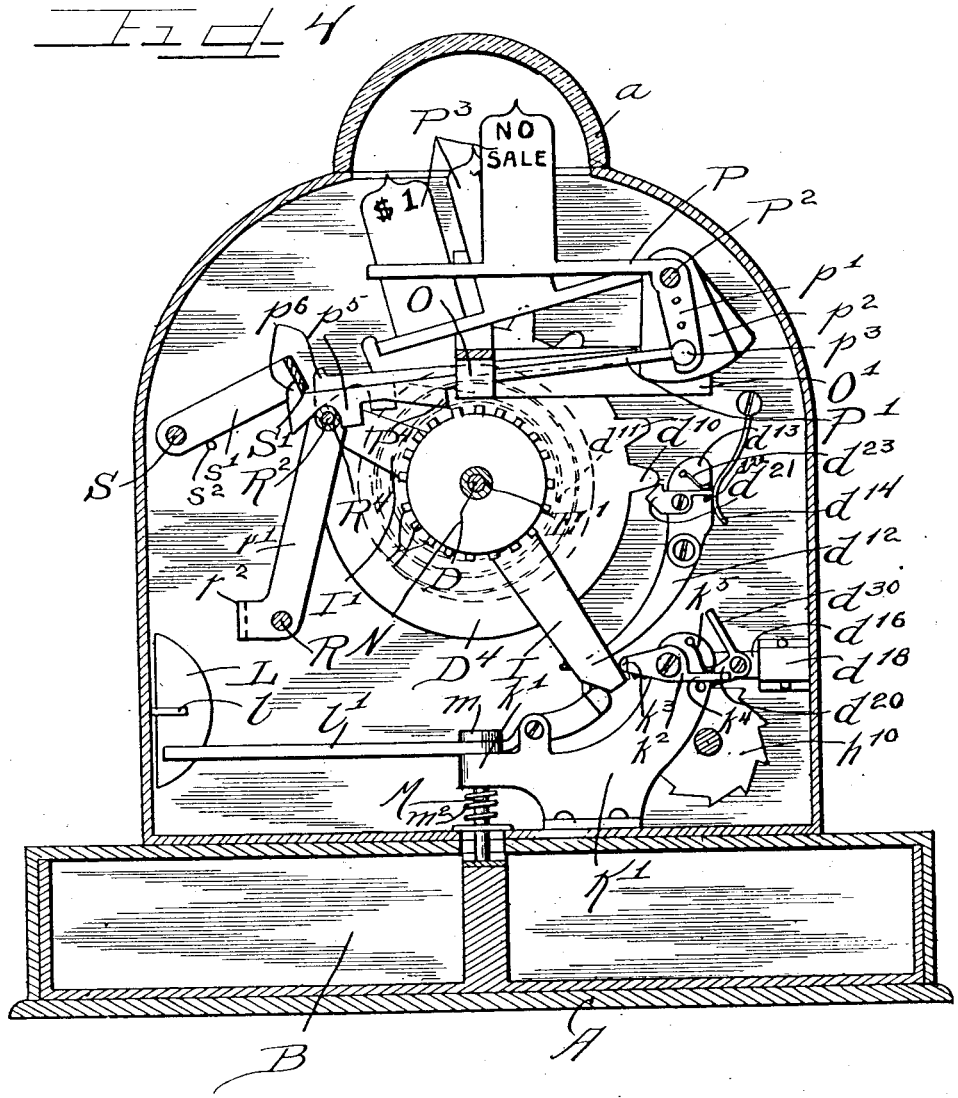

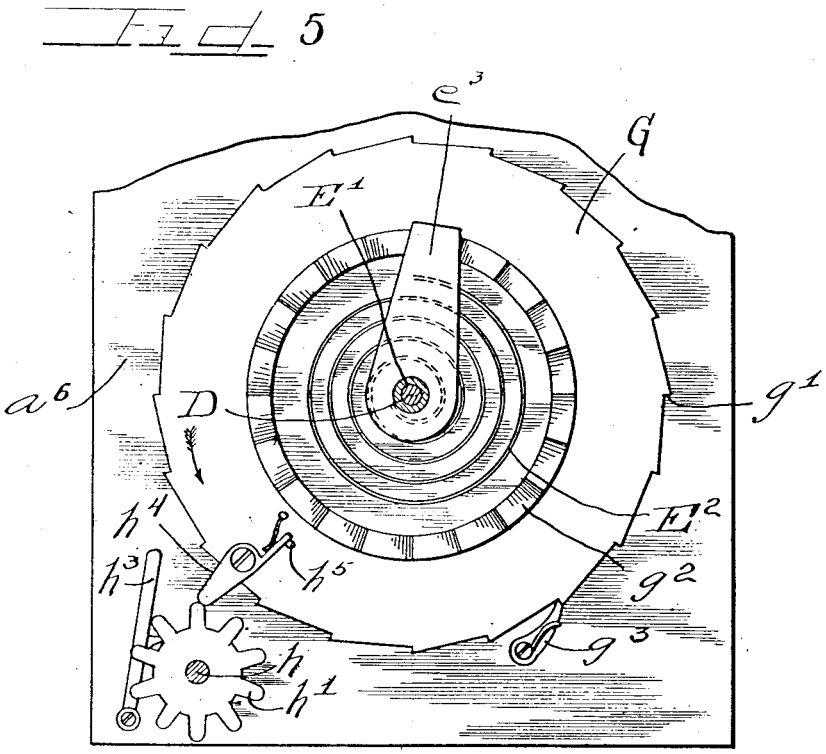
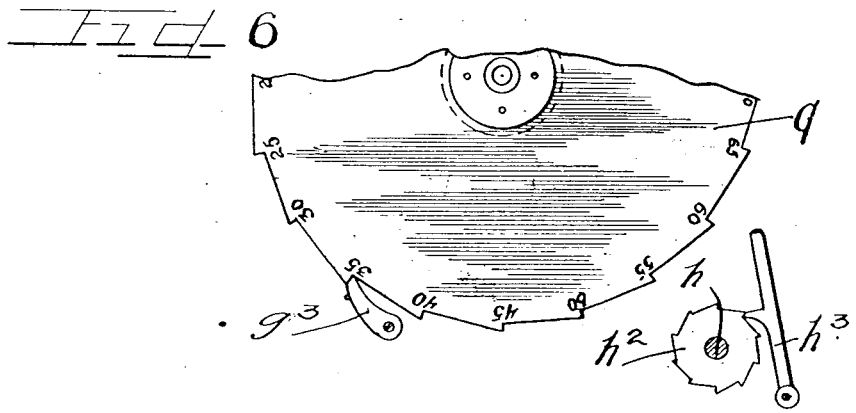

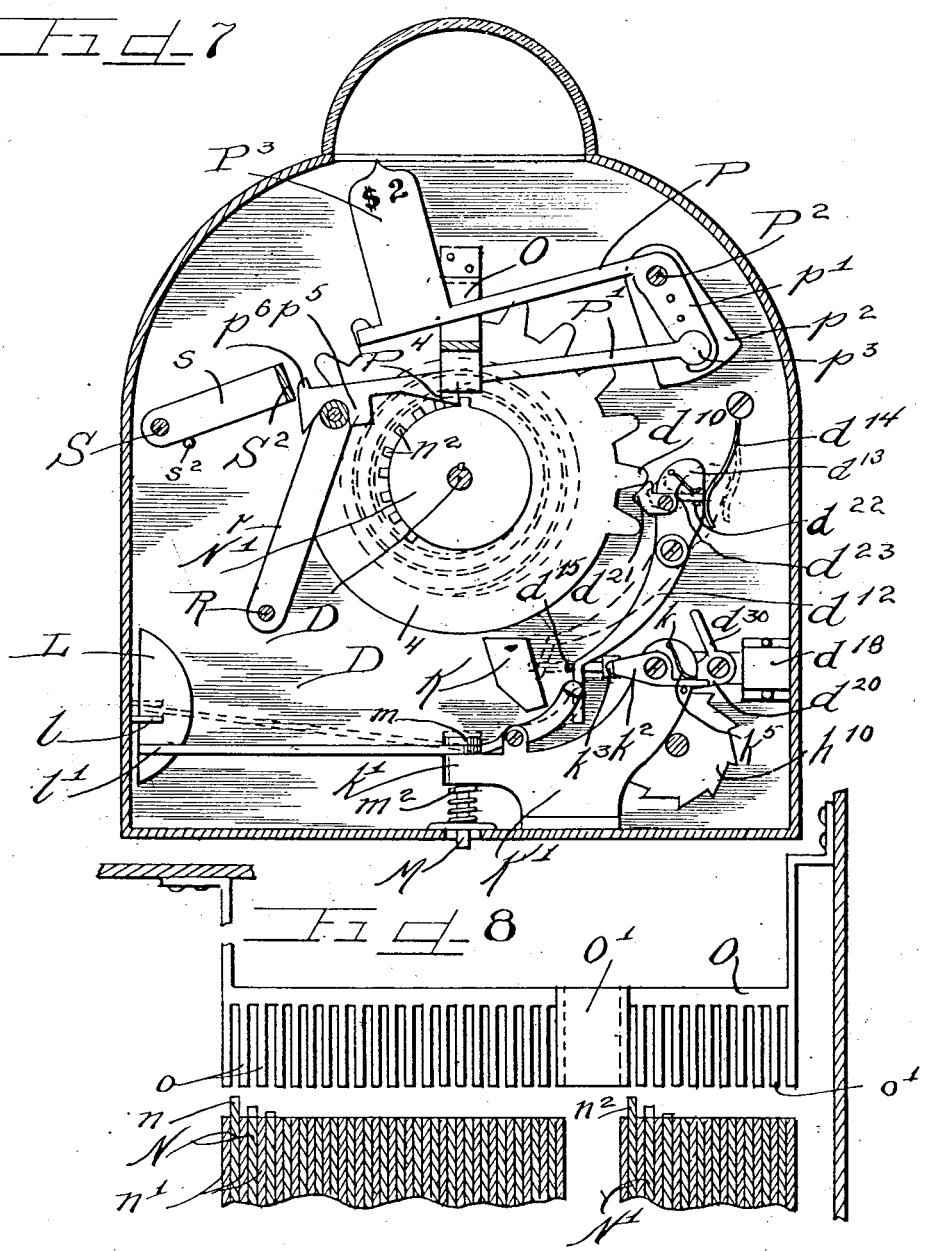

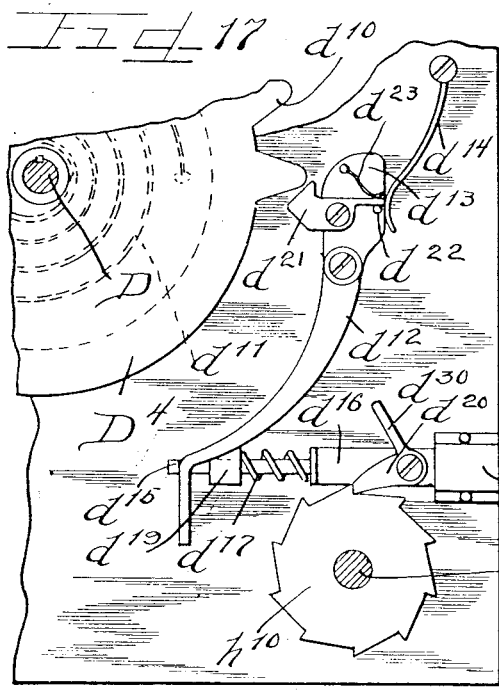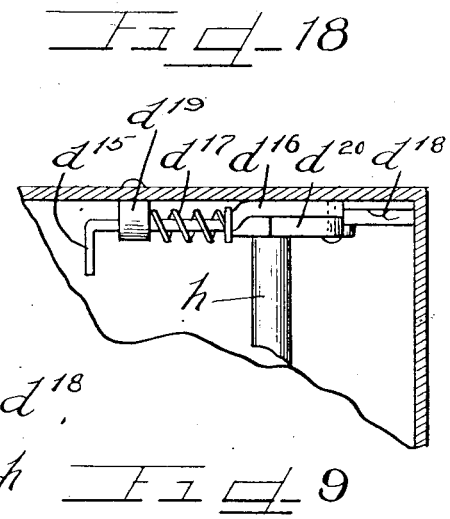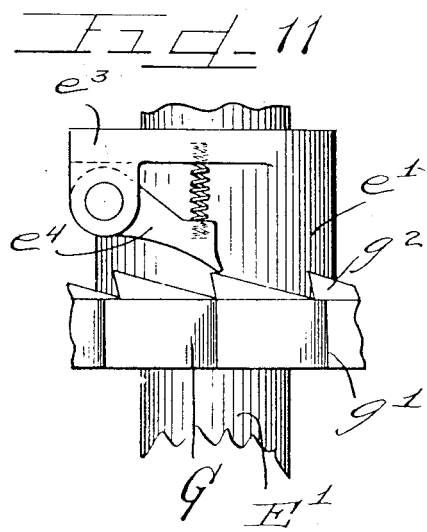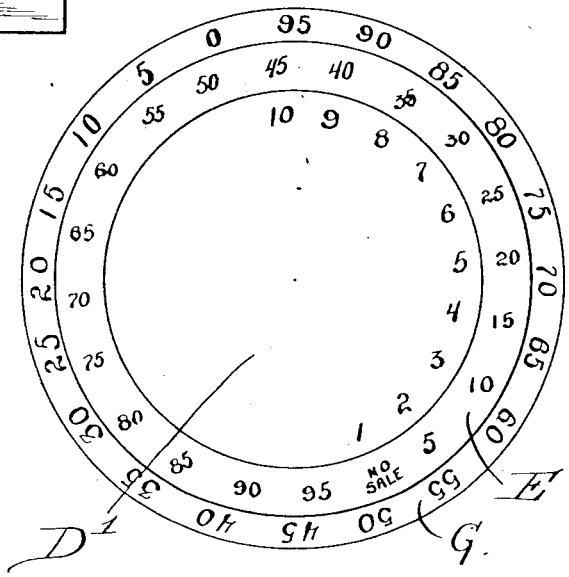

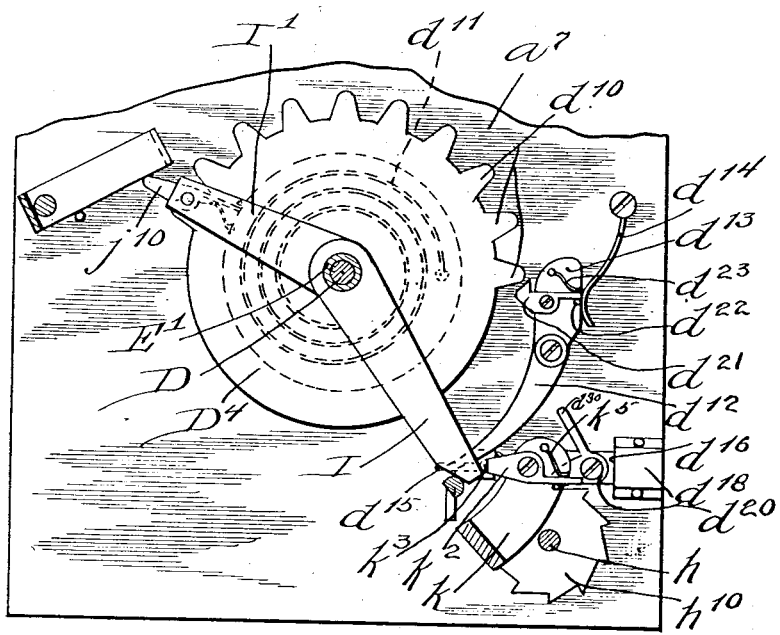
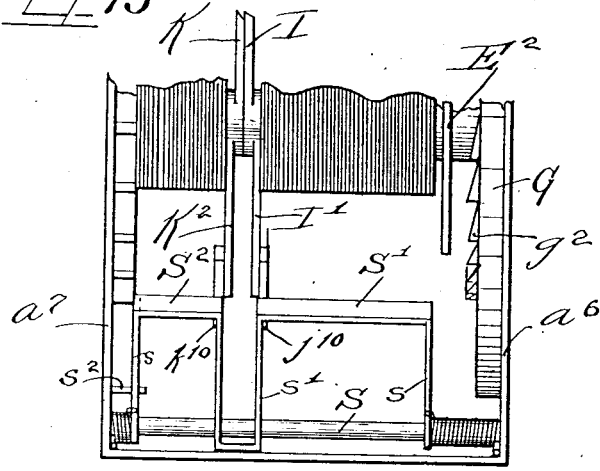

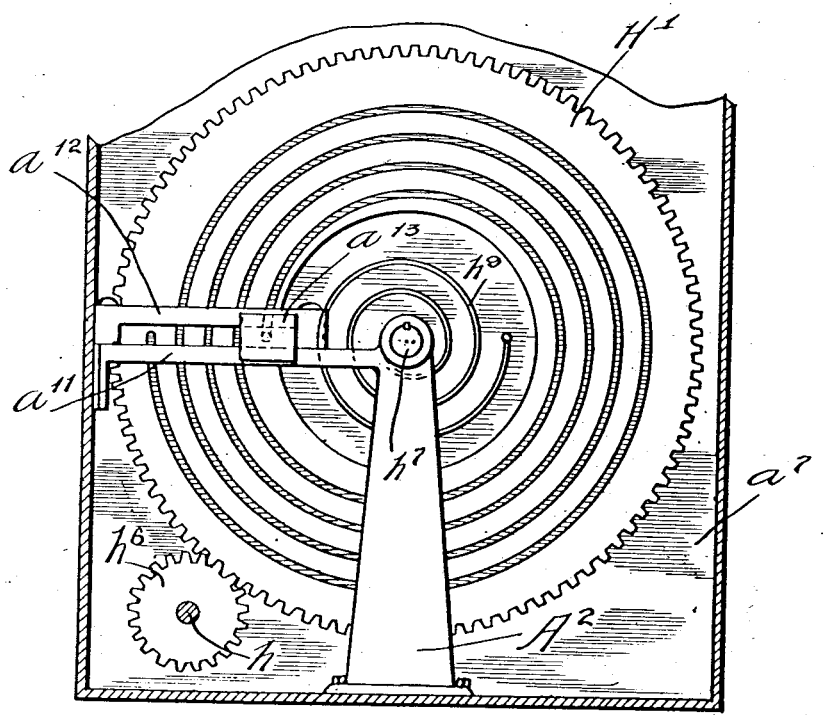
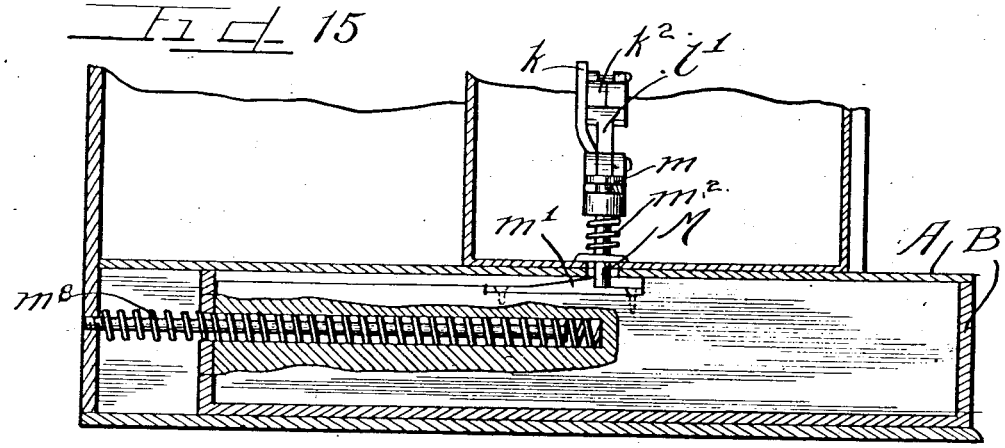

UNITED STATES PATENT OFFICE.

CHARLES SULFER, OF CHICAGO, ILLINOIS.

CASH-REGISTER.

1,095,151. Specification of Letters Patent. Patented Apr. 28, 1914.

Application filed March 20, 1909. Serial No. 484,649.

*To all whom it may concern:*

Be it known that I, CHARLES SULFER, a citizen of the United States, and a resident of the city of Chicago, county of Cook, and State of Illinois, have invented certain new and useful Improvements in Cash-Registers; and I do hereby declare that the following is a full, clear, and exact description of the same, reference being had to the accompanying drawings, and to the letters of reference marked thereon, which form a part of this specification.

Heretofore with the many cash registers devised levers or keys have been required each appropriated to a given number or numbers and the operation of which acts to register the sale upon a suitable indicating mechanism. In some machines the total amount of the sales to, and including the last is also registered. In all such machines, great precision and accuracy are required to prevent mistakes and also to prevent dishonest or careless employes falsifying the record.

Usually a detent or detents of some kind are employed to lock the machine from movement at the completion of the count and with the use of the numerous levers employed many springs are required, any of which, if out of adjustment, afford a source of error. Machines of this kind capable of registering total sales, called "total adders" have heretofore, owing to their complexity, been very expensive—in fact, the price has been and is (for machines heretofore used) practically prohibitory to the smaller dealer.

The object of this invention is to afford a total adding cash register in which keys as such are not employed and in which the absolute accuracy of the register is insured with each operation.

It is also an object of this invention to afford a total adding cash register by means of which the total cash received can be ascertained at a glance as well as the amount of the sale last made.

It is a further object of this invention to afford a cash register in which one or more revolving disks are employed in lieu of a multiplicity of keys and in which springs are practically discarded.

It is a very important object of this invention to provide a cash register in which the registering elements actuate the total registering mechanism in effecting the registering while rotating oppositely, thereby making it impossible for two counts being registered simultaneously as one count.

It is also an object of this invention to provide an accurate, quick acting cash register of such simple and durable construction as to render the same desirable to users of all classes and to enable the machine to be sold at a very low price as compared with such machines now in use.

It is also an object of the invention to afford means for quickly setting the register back to zero whenever desired.

The invention embraces many novel features and consists in the matters hereinafter described and more fully pointed out and defined in the appended claims.

In the drawings: Figure 1 is a front face elevation of a device embodying my invention. Fig. 2 is a side view of the mechanism with the keys in section. Fig. 3 is a horizontal central section taken on line 3—3 of Fig. 1. Fig. 4 is a section taken on line 4—4 of Fig. 3, and showing parts in normal position. Fig. 5 is a section taken on line 5—5 of Fig. 2. Fig. 6 is a fragmentary front elevation of the accumulating wheel shown in rear elevation in Fig. 5. Fig. 7 is a section taken on line 7—7 of Fig. 2. Fig. 8 is a fragmentary detail of the guides for controlling levers. Fig. 9 is a somewhat diagrammatic view showing the five cent's dial and the dollar's dial in normal relation. Fig. 10 is an end elevation of the toothed wheels whereby the count is exhibited. Fig. 11 is an enlarged detail of the detent actuating the accumulating wheel. Fig. 12 is a fragmentary detail illustrating the tripping mechanism for the dollar's count. Fig. 13 is a fragmentary section of a part of the tripping mechanism controlling the visible sales record. Fig. 14 is an enlarged top plan view of a part of the mechanism for releasing the drawer. Fig. 15 is a fragmentary view of the drawer operating mechanism partly in section. Fig. 16 is an enlarged detail partly in section of one of the detents controlling a part of the trip mechanism. Fig. 17 is a fragmentary view of a part of the set back mechanism. Fig. 18 is a fragmentary top plan view of the same. Fig. 19 is an enlarged rear elevation of the set back wheel. Fig. 20 is an enlarged perspective view of the sliding dog for the set-back wheel.

As shown in the drawings: Said machine embraces a base A, containing one or more spring controlled and normally locked drawers B, adapted to be opened automatically at the time the sale is registered. Secured upon said base is the operating mechanism, comprising an accumulating dial or wheel, a five cent wheel and a dollar wheel or dial, each appropriately marked or graduated on its face near its periphery to indicate its character and secured axially in alinement, and adapted severally to operate suitable mechanism for, first, registering the sale, second, exhibiting the amount of the sale for inspection of the purchaser, third, registering the total sales including that just made, and fourth, to return the dials (except the accumulating wheel) to normal position and lastly, mechanism whereby the register can be set back automatically.

Inclosing said mechanism and rigidly secured upon the base is a casing $A'$, of cast or sheet metal or any suitable material, and which may be of any shape or size suitable for the mechanism and in the top of which are transparent plates $a$, such as glass or other material, through which the amount of the last sale can be viewed. Said casing, as shown, comprises a front wall $a^2$, side walls $a^3$, and a rear wall $a^4$, which may be constructed integrally or in any suitable manner to afford suitable strength and to render the mechanism difficult of access to unauthorized interference.

Within the casing and fitting closely in the front thereof is an inner casing comprising a front wall $a^6$, a rear wall $a^7$, and side walls $a^8$, and also, as shown, a bottom floor $a^9$. Journaled in said front wall $a^6$, and the wall $a^7$, is a horizontal shaft D, which will be hereinafter denominated the "dollar" shaft and on the outer end of which is secured the "dollar" dial indicated by $D'$, and as shown, on the right side of which, near its periphery, are provided numerals from 1 to 10 inclusive, said numerals, as shown, being marked on suitable material $d$, attached at the rear side of said dollar dial and showing through suitable apertures opening therethrough, and, as shown, arranged equal distances apart. The lower numeral, namely 1, when the dial is normally positioned, stands from an indicator or stop $A^3$, secured to the base below the center of the dial a distance equal to one of the spaces between adjacent numerals, as shown in Fig. 1.

Recessed into the front wall $a^3$, is the five cent wheel E, which is apertured near its periphery, as shown. Said apertures are large enough to permit the end of the finger to be inserted to rotate the dial, as are also the apertures in the dollar dial. As shown, there are twenty of said apertures arranged equal distances apart around the periphery of the wheel and at the rear side of the dial and covering the apertures is a sheet of any suitable material $e$, on which is indicated the numerals designating the different apertures. In the aperture one space at the right from the stop or indicator $A^3$ "No sale" is marked corresponding in position with the numeral 1, on the dollar dial, the succeeding apertures after that marked "No sale" are marked respectively 5, 10, 15 and so forth, increasing by five cents to and including the twentieth space, which is marked 95 cents, said aperture being located at the stop $A^3$. Movement of the dial each space after "No sale" thus indicates a sale amounting to five cents in excess of that shown at the rear of the preceding aperture. Said five cent dial is rigidly secured upon a tubular shaft $E'$, hereinafter called the "five cent" shaft and through which the dollar shaft D, extends. Rotatably secured upon the five cent shaft $E'$, is an accumulating wheel or dial G, whereon the total of petty sales rung up on the five cents wheel are collected and eventually registered when said petty sales amount to one dollar. Said accumulating wheel comprises, as shown, a dial corresponding with the five cent wheel, as shown in Fig. 9, with the exception that the character "0" is substituted for the words "No sale". Said accumulating dial is rotatably carried upon a large bearing therefor, comprising a bearing sleeve or washer $e^2$, rigidly secured to the front wall $a^6$, of the inner casing and upon which said accumulating wheel revolves with the numbers near the periphery thereof, positioned to register with an aperture through the front wall of the casing indicated by $a^{16}$, as shown in Figs. 1 and 2, and positioned directly above the stop $A^3$, and at the top of the dial. As shown, a collar secured at the inner side of the washer $e^2$, and of greater diameter, holds said dial in place. Said accumulating wheel, as shown, is provided with ratchets upon its periphery indicated by $g'$, one being positioned adjacent each of the numeral stations upon the periphery thereof and a spring pawl $g^3$, engages the same and holds the wheel from reverse rotation. On the rear side of said accumulating wheel are provided ratchets $g^2$, projecting from the plane thereof and the teeth of which are directed to correspond with the ratchets $g'$, on the periphery.

Rigidly secured on the five cent shaft is a collar $e'$, on which is rigidly secured a crank $e^3$, provided at its extremity with an inwardly directed spring pawl $e^4$, positioned to engage the ratchet $g^2$, as shown in Fig. 11, to turn the accumulating wheel simultaneously with the five cent dial, so that movement of the five cent dial causes corresponding movement of the accumulating wheel. Rigidly secured by one of its ends to a pin engaged in the washer $e^2$, is a strong spiral spring $E^2$, which is wound around the shafts and the other end of which is secured to the crank $e^3$, so that when the five cent dial is actuated to make a count the tension brought upon said spring is sufficient when the five cent wheel is released to return said five cent dial to normal position while the pawl $g^3$, holds the accumulating wheel from movement.

A register H, of any suitable kind arranged to register dollars is secured within the outer casing and the shaft $h$, thereof extends below and parallel with the dollar shaft and on the end thereof (which projects beneath the accumulating wheel) is provided with a ten toothed wheel $h'$, and a ten toothed ratchet wheel $h^2$, controlled by a lever pawl $h^3$, pivoted to rest against said ratchet by gravity and which acts to hold the register from reversing or rotating in the wrong direction. Secured on the accumulating wheel G, and projecting beyond its periphery to engage and rotate the ten toothed wheel $h'$, one space when the accumulating wheel completes a revolution and the naught again shows in the view aperture, is a spring controlled pawl $h^4$, which is held rigid from backward movement when engaging one of said teeth by means of a stop $h^5$, secured on the accumulating wheel, but yields readily to pressure of said teeth in the opposite direction when it is desired to reverse the rotation of the shaft $h$, in setting back the register. This is accomplished by throwing back the levered pawl $h^3$, from engagement with the ratchet $h^2$, permitting the shaft $h$, to rotate reversely.

For the purpose of reversing the register a pinion $h^6$, is secured on the shaft $h$, in position to mesh with a gear wheel H', of large size, journaled on a stud shaft $h^7$, secured on the standard $A^2$, at the rear of the rear wall $a^7$, of the inner casing. The end of said stud shaft is supported in a washer $h^8$, secured on said rear wall, as shown concentric with the respective dollar and five cent shafts. Said gear wheel rotates freely on said stud shaft and is engaged on one side by said washer and on the other by the enlarged head of the standard and as shown, a strong spring $h^9$, is coiled about said shaft and secured to the gear at its outer end and at its inner secured to said standard so that as said gear is revolved by the pinion $h^6$, the spring is wound up producing tension in the spring, which thereby acts to reverse the register when the pawls are released from the ratchet wheels on the shaft $h$. It is, of course, important to limit the throw of said spring and for this purpose, a spiral groove is provided in the rear face of the gear wheel, which may be of any desired length and which terminates abruptly at each end. A horizontal arm $a^{11}$ extends laterally from the top of the standard $A^2$, and is secured to the casing and bolted thereto is an upper guide groove in which fits a sliding block or dog $a^{13}$, which is flanged to engage said arm and guide bar and is provided on its front side with a central pin $a^{14}$, which projects in said groove in said gear wheel and acts to stop the wheel at each limit of its rotation. Said pin being at the outer end of said groove when the register has completed its highest count, and when the shaft $h$, rotates reversely until the register marks 0 the pin $a^{14}$, reaches the inner end of said groove.

The register and return of the dollar wheel to normal position is accomplished similarly with the five cent dial. On the inner end of said dollar shaft D, is rigidly secured a wheel $D^4$, having as many relatively long teeth $d^{10}$ thereon as there are graduations on the dollar dial and arranged to correspond with the numerals on said dollar dial, as shown in Fig. 9. Said wheel is recessed on one side to receive the strong coiled spring $d^{11}$, which is rigidly secured thereto at one end and at the other is secured upon the wall of the casing or any suitable rigid part of the machine and acts to return the wheel to normal position after rotation.

Pivoted on the rear wall of the inner case is a curved lever $d^{12}$, the upper end $d^{13}$, of which is relatively heavy and is engaged by a spring $d^{14}$, which acts normally to force the lower end of said lever outwardly. The lower end of said lever is bent inwardly and downwardly and engages behind the hooked end $d^{15}$, of a horizontally slidable bar $d^{16}$, which is normally held retracted by means of a spring $d^{17}$, which engages against a shoulder on said bar and against the eye $d^{19}$, secured on the casing and through which the bar slides. As shown, a guide $d^{18}$, is provided on said rear wall, which receives the outer end of said bar so that said bar reciprocates horizontally under the action of said lever. As shown, a gravity acting pawl $d^{20}$, is pivoted on said bar in position to engage a ratchet wheel $h^{10}$, rigidly secured on the register shaft $h$, and is provided with a lever $d^{30}$, whereby the pawl may be retracted. Said ratchet wheel is provided with ten teeth or ratchets corresponding with the teeth on the ratchet wheel $h'$.

Pivoted on the lever $d^{12}$, is a pawl $d^{21}$, the head of which is inclined inwardly to engage the teeth $d^{10}$, of the wheel $D^4$, and is normally held inwardly by a pin $d^{22}$, which is carried on the tail $d^{13}$, of the lever $d^{12}$, and against which the outer end of said pawl engages. As shown, a spring $d^{23}$, is provided on said lever $d^{12}$, in position to engage the outer end of the pawl $d^{21}$, and normally hold it in engagement with the pin $d^{22}$. As the wheel $D^4$, is rotated the teeth $d^{10}$, strike the pawl but the spring $d^{23}$, permits said pawl to tilt to permit the teeth to pass without operating the lever $d^{12}$, but on the reverse rotation of the dials and wheel D⁴, the lower end of the lever $d^{12}$, is thrown inwardly as each tooth passes the pawl $d^{21}$, inasmuch as the tail of the pawl engages the pin $d^{22}$, thereby drawing the pawl $d^{20}$, forwardly, rotating the register shaft $h$, sufficiently to turn up one, on the register just as the tooth slips past the head of the pawl. When the wheel is released at the finishing of the downward movement, the spring $d^{11}$, quickly returns the dollar dial and wheel D⁴, to normal position.

Means are provided for affording the accurate return of the five cent dial and the dollar dial to their normal position and also affording an audible signal when the register is operated and simultaneously opening the money drawer. For this purpose, as shown, a bar or lever I, is rigidly secured on the five cent shaft at its inner end and closely adjacent thereto, a corresponding lever or bar K, is secured on the dollar shaft, as shown in Figs. 2, 3, 4, and 12. Said levers extend downward and beneath the end of the same and secured upon the floor of the casing is a bracket K', provided with an upper laterally directed arm $k$, and an inwardly directed, approximately horizontal arm $k'$. Pivoted on said upper arm $k$, are two detents $k^2$, one for the arm I, and one for the arm K, and each provided at its extremity with a tip of rubber or other resilient material $k^3$, secured thereon, as shown more plainly in Fig. 16. Said detents are each secured upon the same pivot and each provided with a laterally directed tail $k^4$, against which bears a spring $k^5$, which acts to hold said detents normally in position respectively to engage said levers I and K, when the same are returned to normal position. On the opposite side of the casing is secured a bell L, of any suitable construction and provided with an operating lever $l$, in a familiar manner. Pivoted on the inwardly extending lower arm $k'$ on the bracket is a lever $l'$, one extremity of which extends beneath the bell lever $l$, and the other extremity of which extends upwardly in a position to be engaged by either of said arms I and K, as the same swings downwardly, as shown in Figs. 4 and 7, so that movement of either the five cent dial or the dollar dial acts to ring the bell. Said lever $l'$, adjacent the extremity of the arm $k'$, engages beneath the head $m$, of a latch pin M, which extends through the base of the casing and engages a shoulder $m'$, at the top of the drawer B, and is positively held in engagement therewith by means of a spring $m^2$, engaging beneath said arm and a fixed collar on the pin forcing the pin into engagement with the shoulder. As shown, a strong pushing spring $m^3$, is secured in the back of the casing and bears against the drawer B, and acts to throw the drawer open when the latch pin is lifted by said lever.

For the purpose of exhibiting a visible indication to the purchaser of the amount of each sale, disks N, corresponding in number with the number of the spaces or stations, as shown, twenty (20) on the five cent dial are rigidly secured on the five cent shaft, as shown in Figs. 3, 4, 7 and 8, and between the same are secured spacing plates $n'$, affording practically a solid roll for the entire length of said five cent shaft. Each of said disks is provided at its periphery with a tooth $n$, and the disks are arranged successively on the shaft so that the tooth on each disk is a fractional part of the periphery of the disk behind the tooth of the preceding disk corresponding with the number of disks; that is to say, if twenty disks are employed each succeeding tooth would be one-twentieth of the periphery of the disk to the rear of the tooth on the preceding disk. In a corresponding manner the dollar shaft is provided with disks N', each provided with a tooth $n^2$, arranged to correspond with the position of the tooth on the dollar shaft, as shown in Fig. 7. Rigidly secured in the casing above the disk is a comb O, having depending teeth $o$—$o'$, between which are spaces corresponding in width to the thickness of the disks and positioned directly above the same, as shown in Fig. 8. Said comb, as shown, is constructed in two parts integrally connected and at the space or intervals between the disks for the dollar shaft, and those for the five cent shaft, an elbow or bend O', is provided which extends laterally as shown in Fig. 4, to near the side of the casing.

Extending longitudinally of the casing in the top thereof is a shaft $P^2$ having pivoted thereon bell crank levers, one for each disk of the five cent shaft, and one for each disk of the dollar shaft, and directly over said disks and also extending over the combs. Each of said levers comprises an inwardly directed arm P, having an upright tablet $P^3$, integrally secured thereon, as shown in Figs. 4 and 7, and in position to be swung into the view space above the casing. Said tablets are respectively marked to correspond with the successive stations or indications on the five cent wheel and on the dollar dial. The other ends $p'$, of said levers are directed downwardly and each is provided with a broad spacing plate $p^2$, rigidly secured thereto and which fills the space between succeeding arms. On the forward side of each downwardly extending arm $p'$, is a ball shaped socket in which fits the rounded end $p^3$, of a bar P', which extends through the appropriate slot in the comb above its disk and is provided with a downwardly directed shoulder $P^4$, abrupt on its side adjacent the articulation of said bar and affording an easy incline in the other side. Said shoulders are arranged in alinement along the tops of said disks as shown in Fig. 2, and the inclined rear side of each permits said bar to be lifted as the tooth on its disk passes beneath the same, revolving forwardly, and making the count. Secured on the casing below and on the opposite side from the register is a shaft R—R', formed of two parts in alinement, one beneath the five cent shaft and the other beneath the dollar shaft and on the outer end of which are arms $r$, which extend upwardly therefrom. At their adjacent ends the shafts R and R', are connected by means of upwardly directed arms $r'$, engaged together by a laterally directed elbow $r^2$, as shown in Figs. 3 and 4. On the arms $r$ and $r'$, are carried shafts $R^2$ and $R^3$, each provided with a sleeve $R^4$, thereon serving as a roller. As shown the arms extend to approximately the same height as the top of said disks and normally incline inwardly toward the same. Said bars P', are each provided at the outer ends with a notch which engages on said rollers on the shafts $R^2$—$R^3$, and on the inner side is relatively abrupt but on the outer side or adjacent the end is inclined, as shown in Figs. 4 and 7.

The upper side of the bar P', is relatively straight to near its extremity at which point is provided an upwardly extending tooth or finger $p^6$, the point of which at the extremity of the bar, inclines upwardly affording an easy ascent over said finger or detent. Pivoted on the casing is a shaft S on which is carried a metallic stirrup comprising a bar of metal bent to afford ends $s$ engaged on the shaft and intermediate elbow $s'$ also engaged on said shaft and bars $S'$—$S^2$ at the outer ends of said arms $s$ and the elbow $s'$ as shown in Fig. 13 adapted to engage over the finger or detent $p^6$ on said bar P'. As shown said stirrups are supported at all times in position to engage the ends of said bars by means of a stop $s^2$ secured on the casing and as shown springs are secured on the shaft S and engage the arms $s$ and act to return the same when it is elevated in passing over said fingers.

Rigidly secured on the five cents shaft and the dollar shaft and as shown integral with the arms I and K are arms I' and $K^2$ which normally extend below the stirrups and are provided at their extremities with a detent $j^{10}$ and $k^{10}$ pivoted on their outer sides adapted to engage beneath and to lift the stirrups as shown in Figs. 12 and 13 and each of which is provided with a tail directed toward the dial shafts adapted to engage beneath a stop on the arms I' and $K^2$ as shown in Fig. 12. A spring engages beneath each tail as shown in dotted lines in Fig. 12, and acts to hold said detents extended when the arms move upward but permit the detents to yield when the arms I' and $K^2$ swing downwardly past the stirrups after each record.

The operation is as follows: The register having been set at zero and the drawer closed any sale may be rung up by engaging the finger in a corresponding socket in the dial and drawing the dial down until the finger engages against the stop $A^3$. If for instance "no sale" is registered the movement of the five cents dial produces no movement of the accumulating dial and said dial is held by its detent or pawl from reverse movement. The return of the dial brings the tooth on the appropriate disk into engagement with the shoulder $P^4$ on the bar $p'$ above the same drawing the bar transversely of the machine and forcing the tooth or fingers $p^6$ beneath the stirrup and elevating the "no sale" tablet as shown in Fig. 4 so that said tablet can be plainly read through the view space at the top of the casing. When either dial is actuated the arms I or K are drawn downwardly releasing the drawer by lifting the pin M and producing an audible signal by ringing the bell. When the dial is released to return to normal position the return movement brings the levers I and K to rest against the resilient end $k^3$ of the detent $k^2$, and the yielding pawls $j^{10}$ and $k^{10}$ at the extremity of the arms I' and $K^2$ permit said arms to fall beneath the stirrup $S'$—$S^2$ as shown in Figs. 12 and 13. The "no sale" or other last amount registered will remain in view until the machine is again used. Should a sale be registered as for instance twenty cents the finger is placed in the appropriate aperture in the five cents dial and the dial drawn down as before described with the effect that the first movement of the dial rings the bell, opens the drawer, as before described and also the detent on the arm I' engages beneath and lifts the stirrup S' releasing the same from the finger $p^6$ of the bar $p'$ engaged thereby permitting the same to move forwardly as gravity drops the tablet and no other tablet will appear until the limit of movement having been reached the tooth on the disk appropriated to the "twenty cent station" on the five cents dial engages the appropriate bar with its tooth and forces the same transversely of the casing as before described elevating the appropriate tablet into view. This rearward movement of said bar forces the shaft $R^2$, back sufficiently to lift the remaining bars above contact with the teeth on the other disks, thus permitting the parts to return to normal position. The record of twenty cents sale is transmitted to the accumulating wheel by means of the pawl $e^4$, and said accumulating wheel is held from reverse movement by the pawl $g^3$, which engages the peripheral teeth thereon and the total petty sales less than one dollar may be clearly seen by viewing the same through the aperture $a^{16}$, in the front of the casing. As the accumulating wheel revolves, when the petty sales amount to one dollar the tooth or finger $h^4$, thereon engages one of the teeth of the ten toothed wheel $h'$, rotating the same one notch or counting one upon the registering mechanism. In the same manner the amounts upon the dollar dial or upon both the dollar and five cents dials is registered, the drawer is opened and the bell rung and at the close of movement an indicator is shown in the view space, except that in registering the cents mechanism registers the amount on the downward stroke of the dial, and the dollar mechanism registers the amount on the return or reverse movement of the dial. This is very important as it is impossible for the pawls of the respective cents and dollar mechanisms to actuate their ratchets $h'$ and $h^{10}$, simultaneously which might otherwise occur with the result that only one dollar would be registered instead of two.

Total sales may be known at any time by reading the amount on the register as dollars and the amount seen through the view aperture $a^{16}$, in the front casing as cents. When it is desired to reset the register the pawls $h^3$ and $d^{20}$, are lifted out of engagement with their ratchets by any suitable mechanism not shown, which engages their levers and the action of the spring $h^9$, acts to reverse the gear wheel $H'$, thereby reversing the register as shown in Fig. 19, and the stop or sliding block $a^{13}$, slowly travels toward the center impelled by its engagement in the spiral groove in said gear until the pin $a^{14}$, thereof rests at the inner end of said groove as shown in Fig. 19, the register will then read 0.

While I have shown the dials as comprising a five cents dial and dollar dial, it is evident that any desired number of spaces may be provided on the five cents dial thus, if desired, the same may be arranged to indicate any number of cents and also if desired, any number of stations may be provided on the dollar dial adapting the same to indicate either more or less than ten dollars as preferred. Any desired type of register and means for setting back to zero may be employed and if desired, the registering device may be actuated either as the dials are turning forwardly, or on the return of the dials to normal position or one dial may register by moving forwardly and the other while returning to normal position. I therefore do not purpose limiting this application otherwise than necessitated by the prior art, as obviously many details of arrangement and construction may be varied without departing from the principles of this invention.

I claim as my invention:

1. In a device of the class described the combination with a rotative dial graduated at its periphery to indicate money values, of a registering mechanism actuated by the rotation of the dial, an accumulating wheel adapted to indicate total petty sales, means connecting said dial and accumulating wheel, a register, a register shaft, pinions thereon, means on said accumulating wheel adapted to engage one of said pinions to operate the register, a rotatable grooved gear wheel adapted to mesh with another of said pinions, means for rotating said gear wheel to reverse the rotation of the register and means slidable in the groove in said gear wheel whereby the reverse rotation of said gear wheel may be regulated.

2. In a device of the class described the combination with concentrically mounted interfitting rotative dials, of rearwardly directed shafts thereon, one rotative within the other, a register and means operatively connecting said shafts and register adapting said shafts to register the total dollars at said register during the forward movement of one of said dials and during the return movement of the remainder of said dials.

3. In a machine of the class described the combination with a casing of two concentric independently rotative dials journaled parallel with the face thereof and graduated to mark low and high denominations of money respectively, a stop secured adjacent said dials and indicating the limit of movement thereof, finger apertures in the dials at the point of graduation, an accumulating wheel journaled concentrically with said dials and graduated to correspond with the lower denomination dial, positively acting mechanism driving said accumulating wheel with said low denomination dial, concentric shafts on said dials, springs connected with said shafts acting to return said dials to normal position after each count, a plurality of disks on said shafts, a tooth on each disk, arranged out of alinement with the teeth on the other disk and view tablets operated by said teeth.

4. In a machine of the class described the combination with a casing of two concentric independently rotative dials journaled parallel with the face thereof and graduated to mark low and high denominations of money respectively, a rigid stop secured adjacent said dials and indicating the limit of movement thereof, finger apertures in the dials at the point of graduation, an accumulating wheel journaled concentrically with said dials, and graduated to correspond with the lower denomination dial, and rotative in but one direction, a spring controlled detent driving said accumulating wheel from said low denomination dial, concentric shafts on said dials and springs thereon acting to return either of said dials to normal position after each count and means operated by each of said shafts adapted to display the amount of each sale.

5. In a machine of the class described the combination with a casing of two concentric independently rotative dials journaled to revolve in the plane of the front face thereof and graduated to mark low and high denominations of money respectively, a stop secured adjacent said dials and indicating the limit of movement thereof, finger apertures in the dials at the point of graduation, an accumulating wheel journaled concentrically with said dials and graduated to correspond with the lower denomination dial, and rotative in but one direction, positively acting mechanism carried on the back of the low denomination dial and driving said accumulating wheel, a rearwardly directed shaft on each dial, one rotative within the other, springs thereon acting to return either of said dials to normal position after each count, a register mechanism adapting said shafts to actuate the same register and means for returning the register to normal position.

6. In a device of the class described the combination with a plurality of concentric dials, each graduated to indicate different denominations, of a rearwardly directed shaft on each, one rotative within the other, a plurality of disks on said shafts each provided with a tooth out of alinement with the teeth on the other disks, bell crank levers pivoted above the disks, bars thereon adapted to be engaged by said teeth to operate the levers and a tablet on each lever.

7. In a device of the class described the combination with a casing of a dial journaled parallel with the front face thereof and having equally spaced apertures near its periphery and a money denomination less than one dollar marked adjacent each aperture, a stop positioned adjacent said dial and indicating the limit of rotation thereof, a spring acting to return said dial to normal position after each operation, an accumulating wheel journaled concentrically with and positively driven from said dial and graduated to correspond therewith, a pawl holding the same from reverse action, a dollar registering mechanism within the casing, a pivoted pawl on said accumulating wheel acting to turn up one dollar on said register for each rotation of said wheel, said casing having a view aperture therein whereby the number on the accumulating wheel may be read equal to petty sales less than one dollar.

8. In a device of the class described the combination with a casing of a five cents dial journaled parallel with the face thereof and divided peripherally into twenty equal spaces marked one to indicate "No sale" the others successively multiples of five cents, sockets in said dial at each of said divisions, a stop positioned closely in advance of the dial acting to limit the rotation thereof in registering, an accumulating wheel graduated and marked similarly with said dial, and journaled at the rear thereof concentrically therewith, a pawl driven by the dial and acting to move the accumulating wheel, a pawl holding said wheel from reversal at the end of each count, a dollar registering mechanism and means operated by the accumulating wheel acting to register one dollar thereon, with each complete revolution thereof and automatic mechanism acting to exhibit the amount registered at each operation.

9. In a device of the class described the combination with a casing of a five cents dial journaled parallel with the face thereof and divided peripherally into twenty equal spaces marked one to indicate "No sale" the others successively multiples of five cents, sockets in the face of said dial at each of said divisions, a stop positioned closely in advance of the dial acting to limit the rotation thereof, an accumulating wheel journaled behind said dial and graduated and marked similarly therewith, a pawl driven by the dial and acting to move the accumulating wheel, means holding said wheel from reversal at the end of each count, a dollar registering mechanism and means operated by the accumulating wheel acting to register one dollar thereon with each complete revolution thereof, automatic mechanism acting to exhibit the amount of sale when registered, said casing having a view aperture therein through which total petty sales less than one dollar may be read.

10. In a machine of the class described a dial graduated to indicate cents, a dial concentric therewith graduated to indicate dollars, a shaft on each dial one of which extends through and is journaled in the other, a dollar registering mechanism operatively connected with said shafts, a grooved wheel adapted to return the register to normal position, an actuating spring thereon, and a follower in said groove adapted to limit the movement of said wheel.

11. In a machine of the class described the combination with a dial graduated to indicate cents, of a dial concentric therewith graduated to indicate dollars, a shaft on each dial, one extending through and journaled in the other, downwardly directed levers thereon, a bell, means operated by said levers adapted to ring the bell when the dials are operated, a dollar register, means operatively connecting said register with the shafts, a plurality of tablets and means adapted to selectively elevate said tablets to view position.

12. In a machine of the class described a dial graduated to indicate cents, a dial concentric therewith graduated to indicate dollars, a shaft in said dial, a spring controlled wheel thereon, a dollar registering mechanism, a lever operated by said wheel adapted to operate the register, an individual register operated by the cents dial to indicate the sum of petty sales less than one dollar and means connected therewith acting to register one on the dollar register when total petty sales equal one dollar and mechanism acting to afford a visible exhibit of the amount of each sale after the register thereof.

13. In a device of the class described the combination of a casing of a cent dial and a dollar dial rotatable in a plane parallel with the front face thereof and graduated peripherally to indicate respectively cents and dollar, a dollar registering mechanism driven by the dollar dial, an accumulating wheel driven by the cent dial and indicating the sum of petty sales less than one dollar, co-acting means on said register and accumulating wheel whereby each complete revolution of the accumulating wheel actuates said dollar register, and mechanism for setting back the dollar register to naught, means affording an audible signal prior to the register and mechanism actuated by respective dials acting to visably exhibit the amount of the individual sale after it is registered.

14. In a machine of the class described a set back mechanism comprising in combination with the register and the register shaft a pinion on said shaft, a gear wheel meshing with said pinion and journaled to rotate freely therewith, a spring acting to reverse the rotation of the register, a spiral groove in said gear and a detent slidable in said groove and limiting the number of reverse rotations of the gear.

15. In a cash register concentric dials, each marked with digits, a register, an accumulating mechanism, comprising a wheel marked with digits corresponding to the digits on one of said dials, means engaging the wheel to permit rotation in one direction only, teeth engaged to one side of said wheel, means rotatable with the last named dial adapted to engage said teeth to actuate the accumulating wheel in adding up the transactions, means returning the same and dial to normal and mechanism transferring a count of one to the register for each rotation of the accumuluating wheel.

16. In a cash register dials appropriated to money denomination and marked with digits, an accumulating device for the lowest denomination dial comprising a wheel having teeth corresponding with the number of digits on the lowest denomination dial, teeth engaged to said wheel concentric with the aforesaid teeth, means operated by rotation of said lowest denomination dial to engage one set of teeth to rotate the accumulating wheel, means automatically returning said means to normal, means engaging the other set of teeth on said wheel permitting continuous forward movement of the wheel only, a registering mechanism and means carried by the accumulating wheel for actuating the registering mechanism in transferring the count.

17. In a device of the class described the combination with dials appropriated to money values, and each marked with digits, a register for dollars, a registering mechanism for amounts less than a dollar, comprising an accumulating element, means operated by the forward movement of the appropriate dial for moving the accumulating element a distance depending upon the amount to be registered, mechanism actuated by movement of the accumulating element to transfer a count to the register after moving a predetermined distance and a registering mechanism connected with the other of said dials to operate when the dials rotate reversely.

18. In a device of the class described the combination with dials appropriated to different money values and marked accordingly, a transferring element movable with the forward movement of the lowest denomination dial, an accumulating element actuated thereby and marked to correspond with its dial, means automatically returning the dial and transfer element to normal, means holding the accumulating element from return movement, a registering mechanism connected with the other of said dials to operate when the dials rotate reversely, a register for values of the highest denomination dial and mechanism transferring a count corresponding to one on said register from the accumulating element thereto.

19. In a device of the class described the combination with concentric interfitting rotatable dials, of a register, mechanisms transferring the count of each dial to said register, locking means holding said register to indicate the total amount transferred thereto, a rotatable gear wheel, a spring for rotating the same to rotate the register reversely, a spiral groove in said gear, and a detent slidable in said groove and limiting the number of rotations of said gear.

20. In a device of the class described the combination with concentric interfitting rotatable actuating dials, of a register, mechanism transferring the count from each dial to the register, visible signals, mechanisms operated by actuation of the dials to move to view position a visible signal or signals corresponding to the amount of each transaction and arms movable with the dials for releasing the signals to permit the same to return to normal by gravity during the next forward rotation of the dials.

21. In a device of the class described the combination with concentric interfitting rotatable actuating dials of a register, means for actuating the registering device during the forward movement of one of said dials and during the return movement of the remainder of said dials, visible signals, mechanisms operated by return movement of the dials to move to view position a visible signal or signals corresponding to the amount of each transaction and a stop limiting the movement of each dial in counting.

22. In a device of the class described the combination with concentrically mounted interfitting rotatable dials of a register, mechanism transferring the count from each dial to the register, visible signals, mechanisms operated by actuation of the dials to move to view position a visible signal or signals corresponding to the amount of each transaction, a stop limiting the movement of each dial in counting, means holding said signals in view position and arms movable with the dials for releasing said means permitting the signals to return to normal by gravity.

23. In a device of the class described the combination with concentric shafts of dials one secured on each shaft having digits marked thereon, wheels one on each shaft having teeth thereon corresponding in number to the number of digits on its corresponding dial, a register, a shaft extending approximately parallel of the dial shafts, toothed wheels thereon, one for each dial, means carried by one of said wheels on the dial shafts for contacting one wheel on the register shaft in effecting the transfer and reciprocating mechanism actuated by the teeth of one wheel on the dial shafts to actuate another of said wheels on the register shaft in effecting the transfer.

24. In a device of the class described the combination with concentric shafts of dials one secured on each shaft having digits marked thereon, wheels one on each shaft having teeth thereon corresponding in number to the number of digits on its corresponding dial, a register, a shaft extending approximately parallel of the dial shafts, toothed wheels thereon, one for each dial, means carried by one of said wheels to the dial shafts for contacting one wheel on the register shaft in effecting the transfer, reciprocating mechanism actuated by the teeth of one wheel on the dial shafts to actuate another of said wheels on the register shaft in effecting the transfer, tablets corresponding to the number of teeth on the wheels on the dial shafts and marked appropriately and mechanism for automatically elevating a tablet to represent the amount of each sale registered.

25. A device of the class described embracing a casing, concentric shafts journaled therein, a dial rigidly secured on each, a dollar register, mechanisms actuated by one of said dials to register the sales less than a dollar, means transferring each count of a dollar therefrom to the dollar register, an oscillating lever, means on one of said shafts adapted to actuate the same, reciprocating mechanism actuated by each oscillation of said lever to transfer a count to the dollar register, an audible signal actuated by movement of any dial, visible signals corresponding to the amount of the sale, elevated by movement of any of said dials, a money drawer, a lock therefor, means simultaneously unlocking the same as the audible signal is sounded and a spring opening said drawer.

26. In a device of the class described a casing, shafts journaled therein, dials rigidly secured on said shafts, appropriated to dollars and lower denomination money values, a register, a shaft secured thereto, an accumulating wheel on one of the dial shafts, a toothed wheel on the register shaft, means carried by the accumulating wheel adapted to mesh with said toothed wheel to impart a fraction of a revolution thereto for each revolution of the accumulating wheel, a pivotally supported lever, a toothed wheel on the dollar shaft, a pawl pivoted to the lever actuated by the wheel on the dollar shaft, a ratchet wheel in the register shaft and a pawl actuated by movement of the lever to actuate the ratchet wheel.

27. In a device of the class described concentric shafts appropriated to dollars and smaller money denominations, concentric, interfitting actuating dials secured to the shafts, a register, a shaft therefor, accumulating mechanism registering amounts less than a dollar, operative connections between the same and register shaft, a pivotal lever, a pawl reciprocated thereby, a wheel on the register shaft actuated one tooth for each reciprocation of the pawl, a toothed wheel on the dollar shaft and means operated by rotation of said toothed wheel to actuate the lever.

28. In a device of the class described concentric shafts, appropriated to dollars and smaller money denominations, a register, a shaft therefor, accumulating mechanism registering amounts less than a dollar, operative connections between the same and register shaft, a pivotal lever, a pawl reciprocated thereby, a wheel on the register shaft actuated one tooth for each reciprocation of the pawl, a toothed wheel on the dollar shaft, means operated by rotation of said toothed wheel to actuate the lever, an audible signal, a money drawer, and mechanism operated by rotation of the dials to simultaneously sound the signal and open the drawer.

29. A cash register embracing shafts, dials thereon appropriated to low denomination money and to dollars, mechanism accumulating sales less than one dollar until equaling a dollar, a register, a register shaft, means transferring each count of a dollar from the accumulating mechanism to the register, a toothed wheel on the dollar shaft, a lever, means adapted to intermesh with the teeth on the wheel and impart motion to the lever when the wheel is rotating in one direction only and mechanism operated by the lever for actuating the register.

30. A cash register embracing shafts, dials thereon appropriated to low denomination money and to dollars, mechanism accumulating sales less than one dollar until equaling a dollar, a register, a register shaft, means transferring each count of a dollar from the accumulating mechanism to the register, a toothed wheel on the dollar shaft, a lever adapted to intermesh with the teeth on the wheel and impart motion to the lever when the wheel is rotating in one direction only, mechanism operated by the lever for actuating the register, levers rigidly secured on said dial shafts and a padded stop adapted to contact the same to limit the return movement of the dials.

31. A cash register embracing shafts, dials thereon appropriated to low denomination money and to dollars, mechanism accumulating sales less than one dollar until equaling a dollar, a register, a register shaft, means transferring each count of a dollar from the accumulating mechanism to the register, a toothed wheel on the dollar shaft, a lever, a pawl adapted to intermesh with the teeth on the wheel and impart motion to the lever when the wheel is rotating in one direction only, mechanism operated by the lever for actuating the register, levers rigidly secured on said dials shafts, a padded stop adapted to contact the same to limit the return movement of each dial, a money drawer, a lock therefor, an audible signal and a lever actuated by said levers on the dial shafts for simultaneously releasing the lock and sounding the signal.

32. In a device of the class described concentric shafts, dials thereon appropriated to money denominations, a register, mechanism transferring the count from the dials to the register, wheels on each shaft, a tooth on each wheel, tablets for each transaction registerable and " no sale," bars corresponding to the number of tablets having pivotal connection therewith, teeth on said bars positioned to be engaged by the tooth on the appropriate wheel, means supporting the free end of said bars and adapted to automatically elevate all of the bars to move the teeth out of operative relation except the bar or bars connected to the tablets corresponding to the transaction registered, means engaging the bar or bars connected to the elevated tablets to hold the same in view position, levers secured to the dial shafts to release the bars permitting return of the signals to normal when the dials are next actuated, a stop limiting the movement of each dial in registering the transaction, means automatically returning each dial to normal and coacting movable stops adapted to limit the return of each dial to normal.

33. In a device of the class described concentric shafts, dials thereon appropriated to money denominations, a register, mechanism transferring the count from the dials to the register, wheels on each shaft, a tooth on each wheel, tablets for each transaction registerable and " no sale," bars corresponding to the number of tablets having pivotal connection therewith, teeth on said bars positioned to be engaged by the tooth on the appropriate wheel, means supporting the free end of said bars and adapted to automatically elevate all of the bars to move the teeth out of operative relation except the bar or bars connected to the tablets corresponding to the transaction registered, means engaging the bar or bars connected to the elevated tablets to hold the same in view position, levers secured to the dial shafts to release the bars permitting return of the signals to normal when the dials are next actuated, a stop limiting the movement of each dial in registering the transaction, means automatically returning each dial to normal, coacting movable stops adapted to limit the return of each dial to normal, a money drawer, an audible signal and mechanism actuated by rotation of the dials to approximately simultaneously ring the bell and open the drawer.

34. In a device of the class described the combination with shafts, of concentric interfitting rotatable dials thereon appropriated to different denominations, a register, a shaft therefor, means transferring the count from the dials to the register, intermeshing elements adapted to automatically set the register to zero, and means stopping the movement of the intermeshing elements at zero position of the register.

35. In a device of the class described the combination with concentric interfitting dials, of shafts therefor, a register, a shaft therefor and operating mechanism between the dial shaft and the register shaft for transferring the count to the register by the forward movement of one of said dials and the return movement of the remainder of said dials.

36. In a device of the class described the combination with concentric interfitting rotatable dials, of shafts therefor, a register, a shaft therefor and operating mechanism between the dial shaft, a register shaft for transferring the count to the register by the forward movement of one of said dials, and the return movement of the remainder of said dials, a gear on the register shaft, a gear journaled and meshed therewith, a spiral groove in the last mentioned gear, a spring rigidly connected to one of said gears and adapted to rotate the same to automatically reverse the rotation of the register, and a detent slidable in said groove to limit the rotation of the grooved gear and the set back of the register.

37. In a device of the class described the combination with dials of shafts secured thereto, a plurality of toothed wheels secured on each shaft, a plurality of levers corresponding in number to the number of wheels, tablets thereon, bars secured to the levers by universal joints, teeth on said bars positioned respectively to be engaged by the tooth on the appropriate wheel, a hinged support for said bars and hinged means adapted to engage the bar secured to the tablet actuated by operation of the dials.

38. In a device of the class described the combination with dials of shafts secured thereto, a plurality of toothed wheels secured on each shaft, a plurality of levers corresponding in number to the number of wheels, tablets thereon, bars secured to the levers by universal joints, teeth on said bars positioned respectively to be engaged by the tooth on the appropriate wheel, a hinged support for said bars, hinged means adapted to engage the bar secured to the tablet actuated by operation of the dials, a register, mechanisms transferring the count thereto by actuation of the dials and mechanism for automatically setting the register to normal.

39. In a device of the class described the combination with dials of shafts secured thereto, a plurality of toothed wheels secured on each shaft, a plurality of levers corresponding in number to the number of wheels, tablets thereon, bars secured to the levers by universal joints, teeth on said bars positioned respectively to be engaged by the tooth on the appropriate wheel, a hinged support for said bars, hinged means adapted to engage the bar secured to the tablet actuated by operation of the dials, a register, mechanisms transferring the count thereto by actuation of the dials, mechanism for automatically setting the register to normal, stops limiting the movement of the dials in both directions, a drawer, a signal and mechanism actuated from the dial shafts for opening the drawer and sounding the signal.

40. A cash register embracing rotatable registering mechanisms each registering when rotating oppositely and concentric, interfitting dials adapted to rotate together, the cents dial adapted to operate the cents registering mechanism when rotating forwardly and the dollar dial adapted to actuate the dollar registering mechanism when rotating back to normal.

41. A cash register embracing a rotatable actuating dial for registering cents on the forward rotation and a rotatable concentric interfitting actuating dial for registering dollars on the return rotation.

42. A cash register comprising mechanisms for registering cents and dollars and said mechanisms adapted only to register when rotating oppositely and concentric, interfitting dials adapted to rotate together, the cents dial adapted to operate the cents registering mechanism when rotating forwardly and the dollar dial adapted to actuate the dollar registering mechanism when rotating back to normal.

43. In a cash register a plurality of concentric interfitting rotatable actuating dials adapted to rotate simultaneously or independently and a registering mechanism connected with one of the dials to operate when the dials rotate in one direction and a registering mechanism connected with the other of said dials to operate when the dials rotate reversely.

44. A cash register embracing a cents registering mechanism and a dollar registering mechanism, said mechanisms mounted concentrically and adapted to register on reverse rotations thereof.

45. In a device of the class described registering mechanisms of different denominations, concentric dials adapted to rotate together, one dial adapted to actuate its registering mechanism on the forward rotation and the other on the return rotation of the dials, and indicating tablets each connected to be operated by the rotation of the respective dial when the dials return to normal.

46. In a cash register a plurality of registering mechanisms, a dial connected to rotate one of said mechanisms when rotating forwardly, a dial connected to rotate the other registering mechanism when rotating reversely from its forward rotation, indicating tablets, an oscillating toothed bar connected with each, and toothed wheels, one for each bar adapted to engage the bar and actuate the same to elevate the respective tablet.

47. In a cash register a plurality of registering mechanisms, rotating dials for actuating the registering mechanisms, mechanism for transferring a count from the lowest to the highest denomination registering mechanism, a spring operated wheel connected with the highest denomination register for automatically setting the same to zero, indicating tablets, actuating bars pivoted thereto, rotatable wheels, and coacting members on the bars and wheels adapting the wheels to pass the bars when rotating in one direction with but actuation of the bars and to actuate the respective bars when rotating oppositely to elevate the proper tablets.

48. In a cash register a plurality of concentric dials adapted to rotate simultaneously, registering mechanism operated oppositely by said dials, mechanism for transferring a count from one registering mechanism to another, a grooved wheel rotatable with the highest denomination registering mechanism, a carriage provided with a pin engaging in the groove, a stop for the carriage and a spring for rotating the grooved wheel.

49. In a cash register a plurality of concentric dials adapted to rotate simultaneously, registering mechanisms operated oppositely by said dials, mechanism for transferring a count from one registering mechanism to another, a grooved wheel rotatable with the highest denomination registering mechanism, a carriage provided with a pin engaging in the groove, a stop for the carriage, a spring for rotating the groove wheel to return the registering mechanism to normal, a bell, a drawer locking bolt and mechanism operated by either dial for simultaneously releasing the locking bolt and ringing the bell.

50. In a cash register rotatable actuating dials, a registering mechanism rotatable with one dial, a mechanism adapted to be operated by the return of one of the dials to normal, a total adding register adapted to be operated by said mechanism, wheels rotatable with the dials, each wheel having one tooth, an indicating mechanism for each tooth adapted to be set to indicating position by the tooth, a member adapted to support any of the indicating mechanisms for the same dial in indicating position, means rotatable with each dial for actuating the member when rotating in one direction and passing said member without actuating the same when rotating oppositely, a wheel geared to the total adding register, and a spring for rotating the wheel and thereby the total adding register to normal.

51. In a device of the class described registering mechanisms of different denominations, concentric dials adapted to rotate together, one dial adapted to actuate its registering mechanism on the forward rotation and the other on the return rotation of the dials, indicating tablets each connected to be operated by the rotation of the respective dial when the dials return to normal, mechanism operated by forward rotation of the dials to release all tablets held in indicating position to indicate the amount of the preceding transaction, a bell, a locking bolt for a money drawer, mechanism for connecting the same to operate simultaneously and independent arms rotatable with the dials, each adapted to engage and operate said last named mechanism.

52. In a cash register a plurality of registering mechanisms, rotating dials for actuating the registering mechanisms, mechanism for transferring a count from the lowest to the highest denomination registering mechanism, a spring operated wheel connected with the highest denomination register for automatically setting the same to zero, indicating tablets, actuating bars pivoted thereto, rotatable wheels, and coacting members on the bars and wheels adapting the wheels to pass the bars when rotating in one direction without actuation of the bars and to actuate the bars when rotating oppositely to elevate the proper tablets, supports for the bars adapted to oscillate the same vertically to permit the wheels passing, and a swinging member for engaging the bars and preventing retraction of a tablet elevated until the next actuation of the dials.

53. In a device of the class described a total adding register, a shaft therefor, a mechanism for rotating the shaft, a dial, a rotating member operating therewith, a member adapted to be oscillated by the member when rotating to normal to actuate the mechanism for rotating the registering shaft a pinion on the register shaft, a gear wheel meshing with said pinion and journaled to rotate freely therewith, a spring connected with the same and adapted to rotate said gear wheel, a spiral groove in said gear and a detent slidable in said groove and limiting the number of reverse rotations of the same.

54. In a cash register dials having finger apertures therein, numerals beyond the finger apertures, a register, a shaft therefor, a ratchet wheel thereon, a reciprocating pawl for actuating the ratchet one tooth for each reciprocation, an oscillating lever for reciprocating the pawl, a toothed wheel rotatable with the dial and a pawl pivoted to the oscillating lever adapted to yield when the dial and toothed wheel rotate forwardly and to actuate the oscillating lever once for each tooth on the wheel that passes the same as the dial and wheel return to normal.

55. In a cash register a plurality of concentric dials adapted to rotate simultaneously, registering mechanisms operated oppositely by said dials, mechanism for transferring a count from one registering mechanism to another, a grooved wheel rotatable with the highest denomination registering mechanism, a carriage provided with a pin engaging in the groove, a stop for the carriage, a spring for rotating the grooved wheel to return the registering mechanism to normal, a bell, a drawer locking bolt, mechanism operated by either dial for simultaneously releasing the locking bolt and ringing the bell, indicator tablets, a wheel for each tablet having a tooth thereon and each wheel rotatable with one of the dials and a mechanism for each tablet adapted to be actuated by the tooth of the respective wheel to set the tablet to indicating position.

56. In a device of the class described registering mechanisms of different denominations, concentric dials adapted to rotate together, one dial adapted to actuate its registering mechanism on the forward rotation and the other on the return rotation of the dials, indicating tablets each connected to be operated by the rotation of the respective dial when the dials return to normal, mechanism operated by forward rotation of the dials to release all tablets held in indicating position to indicate the amount of the preceding transaction, a bell, a locking bolt for a money drawer, mechanism for connecting the same to operate simultaneously, independent arms rotatable with the dials, each adapted to engage and operate said mechanism, a toothed wheel having a geared connection with one of the registers, said wheel having a spiral groove in one face thereof, a spring for rotating the wheel in one direction, and a member extending into the groove adapted to limit the rotation of the wheel.

57. In a cash register a plurality of registering mechanisms, a dial connected to rotate one of said mechanisms when rotating forwardly, a dial connected to rotate the other registering mechanism when rotating reversely from its forward rotation, indicating tablets, an oscillating toothed bar connected with each toothed wheel, one for each bar adapted to engage the bar and actuate the same to elevate the respective tablet, a vertically swinging member, a tooth on each bar adapted to engage said swinging member to hold the tablet elevated, means operated by rotation of the dials for actuating the swinging member to clear the teeth and thereby permit the tablets and actuating bars returning to normal, a bell, a drawer lock, mechanism for simultaneously operating the bell and releasing the lock, and arms rotatable with the dials for actuating said mechanism.

58. In a cash register a plurality of registering mechanisms, rotating dials for actuating the registering mechanisms, mechanism for transferring a count from the lowest to the highest denomination registering mechanism, a spring operated wheel connected with the highest denomination register for automatically setting the same to zero, indicating tablets, actuating bars pivoted thereto, rotatable wheels, coacting members on the bars and wheels adapting the wheels to pass the bars when rotating in one direction without actuation of the bars, and to actuate the bars when rotating oppositely to elevate the proper tablets, supports for the bars adapted to oscillate the same vertically to permit the wheels passing, a swinging member for engaging the bars and preventing retraction of an elevated tablet until the next actuation of the dials, members rotatable with the dials adapted to actuate the swinging member when rotated in one direction to release the bars, and to yield to pass the swinging member when rotating oppositely.

59. In a cash register a plurality of concentric dials adapted to rotate simultaneously, registering mechanisms operated oppositely by said dials, mechanism for transferring a count from one registering mechanism to another, a grooved wheel rotatable with the highest denomination registering mechanism, a carriage provided with a pin engaging in the groove, a stop for the carriage, a spring for rotating the grooved wheel to return the registering mechanism to normal, a bell, a drawer locking bolt and mechanism operated by either dial for simultaneously releasing the locking bolt and ringing the bell, indicator tablets, a wheel for each tablet having a tooth thereon, and each wheel rotatable with one of the dials, a mechanism for each tablet adapted to be actuated by the tooth of the respective wheel to set the tablet to indicating position, rocking members for holding the tablets in indicating position, and members rotatable with the dials for actuating the rocking members to release the tablets to fall to normal.

60. In a device of the class described a total adding register, a shaft therefor, a mechanism for rotating the shaft, a dial, a rotating member operating therewith, a member adapted to be oscillated by the member when rotating to normal to actuate the mechanism for rotating the registering shaft, indicator tablets pivoted above the dial, and a mechanism operated by forward rotation of the dials to release any elevated indicator tablet and by return rotation of the dial to elevate the proper indicator tablet.

61. In a cash register dials having finger apertures therein, numerals beyond the finger apertures, a register, a shaft therefor, a ratchet wheel thereon, a reciprocating pawl for actuating the ratchet one tooth for each reciprocation, an oscillating lever for reciprocating the pawl, a toothed wheel rotatable with the dial, a pawl pivoted to the oscillating lever adapted to yield when the dial and toothed wheel rotate forwardly and to actuate the oscillating lever once for each tooth on the wheel that passes the same as the dial and wheel return to normal, a registering mechanism of lower denomination than the aforesaid register and a transferring mechanism for transferring a count from the same to the higher denomination register.

62. In a cash register a plurality of registering mechanisms, rotating dials for actuating the registering mechanisms, mechanisms for transferring a count from the lowest to the highest denomination registering mechanism, a spring operated wheel connected with the highest denomination register for automatically setting the same to zero, indicating tablets, actuating bars pivoted thereto, rotatable wheels, coacting members on the bars and wheels adapting the wheels to pass the bars when rotating in one direction without actuation of the bars and to actuate the bars when rotating oppositely to elevate the proper tablets, and guides for the actuating bars to prevent displacement thereof.

63. In a cash register actuating dials, shafts connected thereto, wheels on the shafts, indicator tablets, bars pivoted thereto, coacting cams on the wheels and bars adapted to oscillate the proper bars by rotation of the dials to elevate the indicator tablets, a registering mechanism connected with one of the dials to operate when the dials rotate in one direction, a registering mechanism connected with the other of said dials to operate when the dials rotate reversely, an audible signal mechanism, a drawer locking mechanism and members connected to rotate with the dials for operating the same.

64. In a device of the class described a total adding register, a shaft therefor, a mechanism for rotating the shaft, a dial, a rotating member operating therewith, a member adapted to be oscillated by the member when rotating to normal to actuate the mechanism for rotating the registering shaft, a wheel connected with the total adding register, a spring for rotating the same in one direction, and coacting sliding and rigid members for limiting the rotation of the wheel.

65. In a cash register dials having finger apertures therein, numerals beyond the finger apertures, a register, a shaft therefor, a ratchet wheel thereon, a reciprocating pawl for actuating the ratchet one tooth for each reciprocation, an oscillating lever for reciprocating the pawl, a toothed wheel rotatable with the dial, a pawl pivoted to the oscillating lever adapted to yield when the dial and toothed wheel rotate forwardly and to actuate the oscillating lever once for each tooth on the wheel that passes the same as the dial and wheel return to normal, and indicator tablets operated by rotation of the dials to indicate the amount registered.

66. In a cash register a plurality of registering mechanisms, rotating dials for actuating the registering mechanisms, mechanism for transferring a count from the lowest to the highest denomination registering mechanism, a spring operated wheel connected with the highest denomination register for automatically setting the same to zero, indicating tablets, actuating bars pivoted thereto, rotatable wheels, coacting members on the bars and wheels adapting the wheels to pass the bars when rotating in one direction without actuation of the bars and to actuate the bars when rotating oppositely to elevate the proper tablets, supports for the bars adapted to oscillate the same vertically to permit the wheels passing, a swinging member for engaging the bars and preventing retraction of a tablet elevated until the next actuation of the dials, members rotatable with the dials adapted to actuate the swinging member when rotated in one direction to release the bars and to yield to pass the swinging member when rotating oppositely, an audible signal, a locking bolt, and members rotatable with the dials for actuating the same.

67. In a device of the class described a total adding register, a shaft therefor, a mechanism for rotating the shaft, a dial, a rotating member operating therewith, a member adapted to be oscillated by the member when rotating to normal to actuate the mechanism for rotating the registering shaft, a wheel connected with the total adding register, a spring for rotating the same in one direction, coacting sliding and rigid members for limiting the rotation of the wheel, a bell, a locking bolt, a lever for actuating the bell and elevating the locking bolt and an arm rotating with the dial to actuate the lever and also adapated to act as a stop on its return rotation.

68. In a device of the class described apertured dials adapted to receive the fingers for rotating the same, numerals marked beneath each aperture in the dials, registers, mechanisms operated by the dials for actuating the registers, an audible signal mechanism, a locking mechanism, mechanism operated by rotating the dials for operating the audible signal mechanism and the locking mechanism, an indicating mechanism operated by each rotation of any dial to indicate the amount of the transaction, and a mechanism for automatically setting one of the registers to normal and the other register set to normal by rotation of the proper dial.

In testimony whereof I have hereunto subscribed my name in the presence of two subscribing witnesses.

CHARLES SULFER.

Witnesses:
K. E. HANNAH,
LAWRENCE REIBSTEIN.